(12) United States Patent
Braswell

(10) Patent No.: US 8,042,854 B2
(45) Date of Patent: Oct. 25, 2011

(54) PORTABLE OUTDOOR WEIGHT TRAINING PLATFORM

(76) Inventor: David J Braswell, Austin, TX (US)

( * ) Notice: Subject to any disclaimer, the term of this patent is extended or adjusted under 35 U.S.C. 154(b) by 607 days.

(21) Appl. No.: 12/012,066

(22) Filed: Jan. 31, 2008

(65) Prior Publication Data

US 2009/0195008 A1 Aug. 6, 2009

(51) Int. Cl.
*B60P 3/35* (2006.01)

(52) U.S. Cl. .................................................. 296/26.15

(58) Field of Classification Search ............... 296/26.03, 296/26.08, 26.11, 26.12, 26.15, 10, 13, 14; 52/69, 70, 71, 143, 79.5
See application file for complete search history.

(56) References Cited

U.S. PATENT DOCUMENTS

| 2,259,783 | A | * | 10/1941 | Sparling | 52/69 |
| 2,670,986 | A | * | 3/1954 | Presnell | 296/173 |
| 2,768,719 | A | * | 10/1956 | Morris et al. | 190/107 |
| 3,080,187 | A | * | 3/1963 | Lamb | 296/14 |
| 3,715,141 | A | * | 2/1973 | Cary | 296/173 |
| 3,841,690 | A | * | 10/1974 | Piercy | 296/10 |
| 4,232,488 | A | | 11/1980 | Hanley | |
| 4,240,646 | A | * | 12/1980 | Scott | 280/30 |
| 4,696,132 | A | * | 9/1987 | LeBlanc | 52/69 |
| 4,720,945 | A | * | 1/1988 | Berranger et al. | 52/7 |
| 4,758,008 | A | * | 7/1988 | Moddejonge | 280/37 |
| 5,152,109 | A | * | 10/1992 | Boers | 52/143 |
| RE34,468 | E | * | 12/1993 | Rau et al. | 296/26.02 |
| 5,310,209 | A | | 5/1994 | Holman | |
| 5,716,090 | A | * | 2/1998 | Chang et al. | 296/26.01 |
| 5,822,930 | A | * | 10/1998 | Klein | 52/143 |
| 5,833,294 | A | | 11/1998 | Williams | |
| 5,934,728 | A | | 8/1999 | Nishi | |
| 5,964,065 | A | * | 10/1999 | Migurski et al. | 52/64 |
| 6,345,471 | B1 | | 2/2002 | Gyllenhammar | |
| 6,644,708 | B1 | * | 11/2003 | Grzegorzewski et al. | 296/32 |
| 6,962,370 | B2 | * | 11/2005 | Simpson | 280/789 |
| 7,052,033 | B2 | * | 5/2006 | McDonell | 280/656 |
| 7,059,666 | B2 | * | 6/2006 | Harrison | 296/186.4 |
| 7,073,816 | B1 | * | 7/2006 | Larson et al. | 280/656 |
| 7,222,905 | B2 | * | 5/2007 | Jaeck | 296/1.07 |

* cited by examiner

*Primary Examiner* — H Gutman
(74) *Attorney, Agent, or Firm* — James Minerve

(57) ABSTRACT

An expandable trailer for transporting and using exercise equipment on the expanded trailer platform, comprising a boxcar shaped trailer mounted on wheels with a hitch for connecting to a motor vehicle. The boxcar walls are hingedly connected to the floor and pivotally open, extending the boxcar platform. Preferred embodiments include truss systems mounted to the platform equipped with cylinder type braces or pulleys that facilitate manually or automatically opening and closing the boxcar walls.

10 Claims, 18 Drawing Sheets

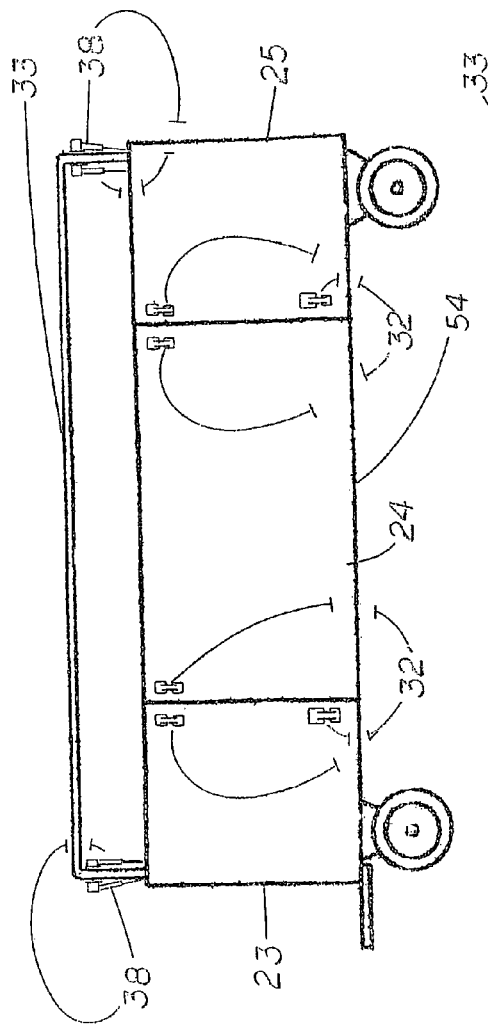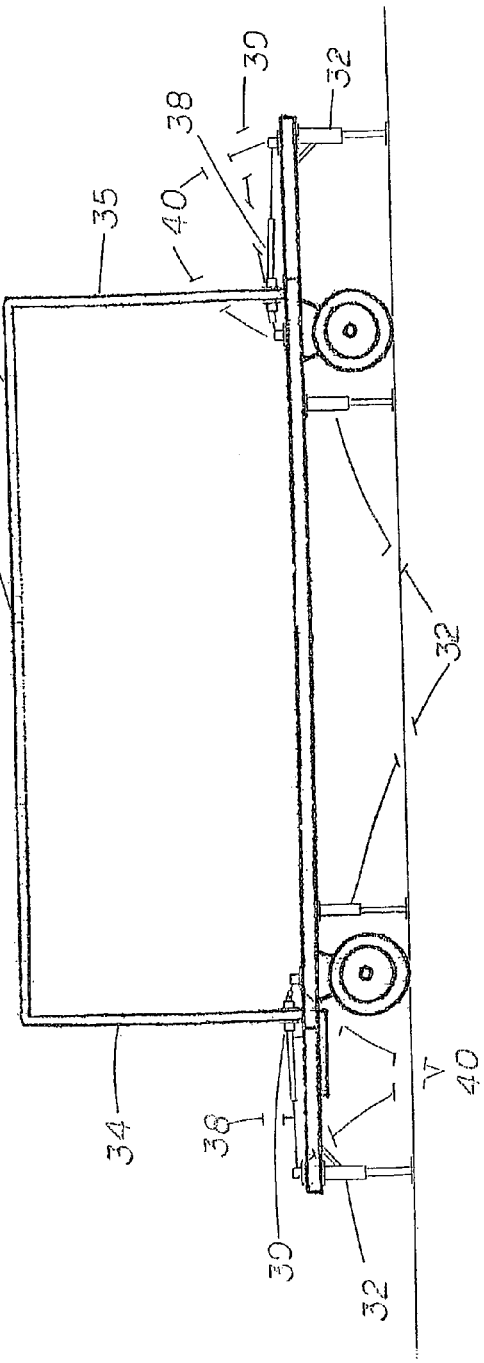

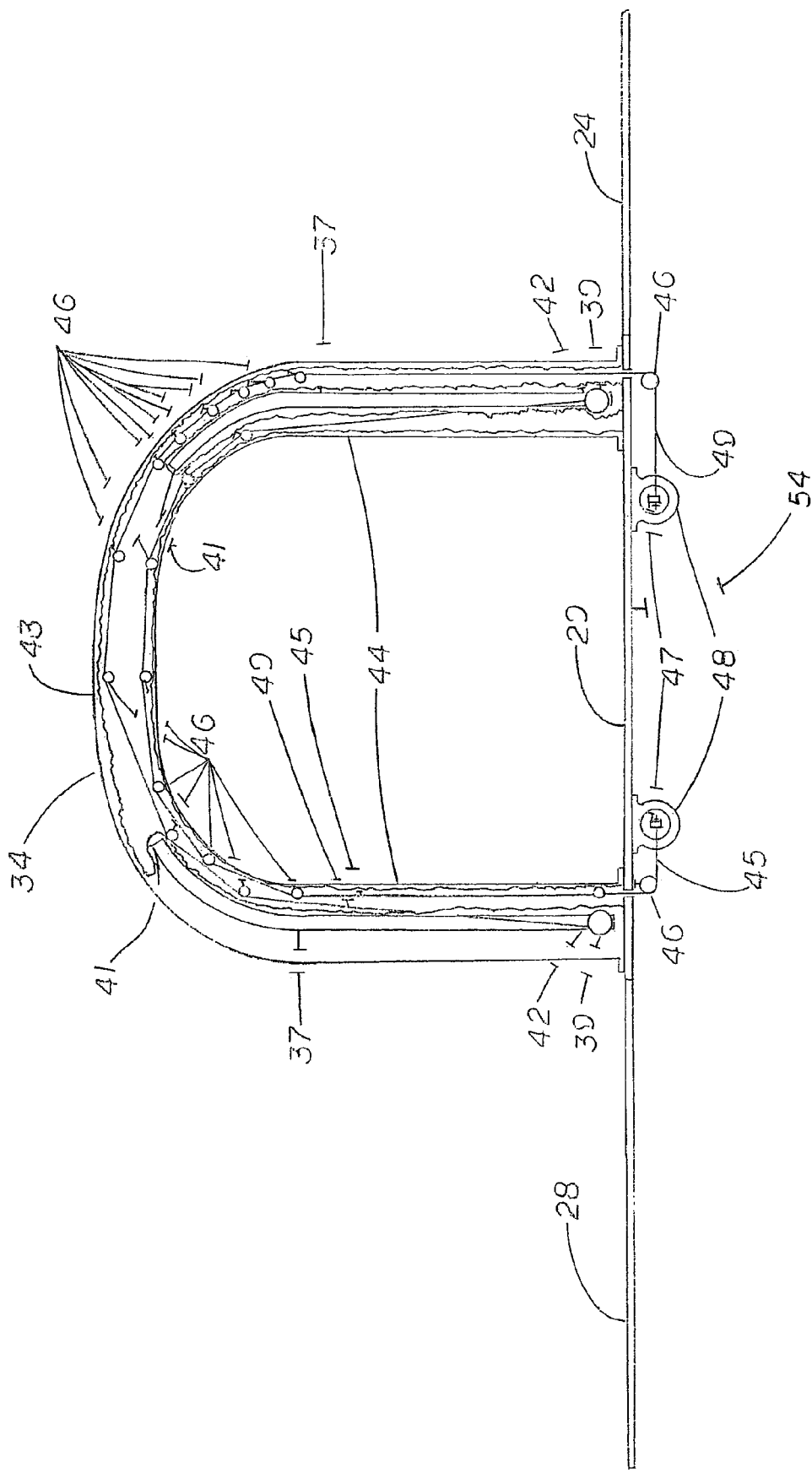

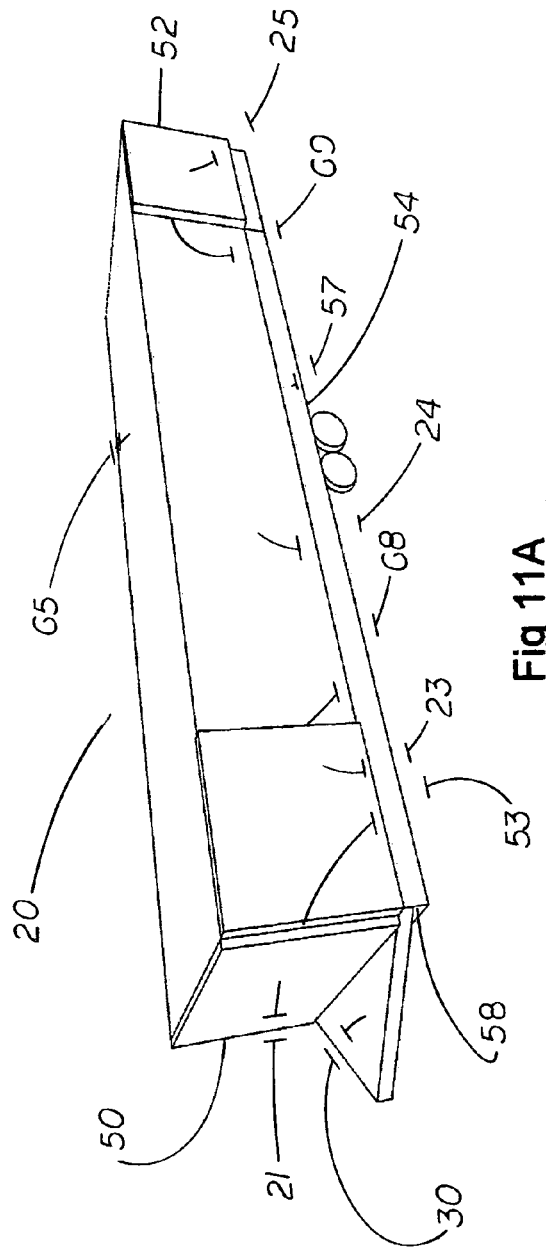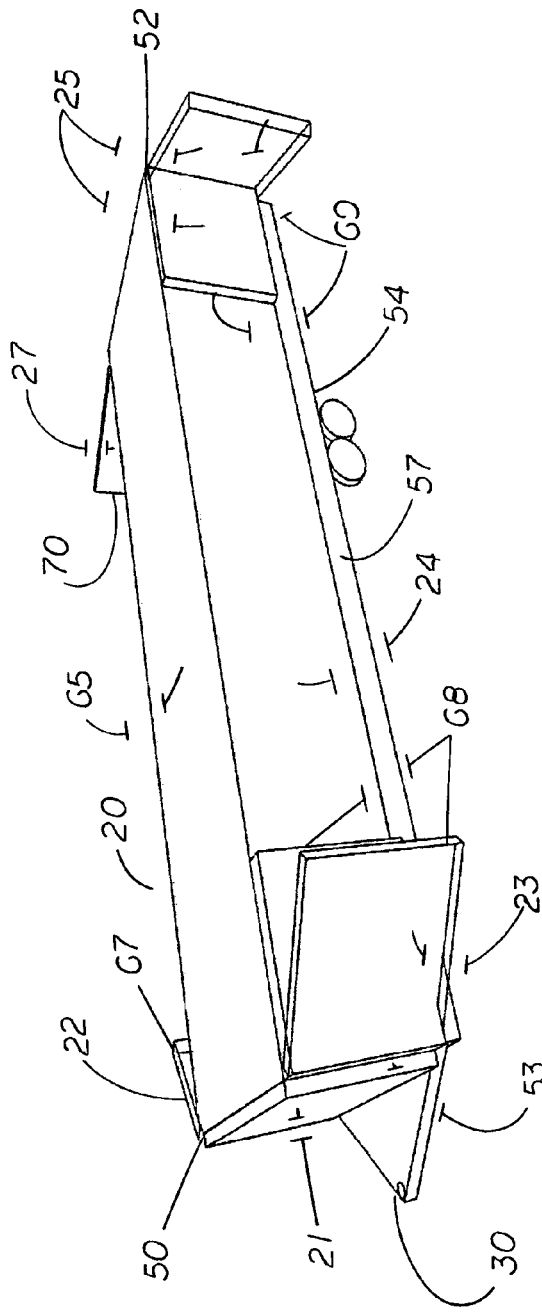
Fig 11A
Fig 11B

PORTABLE OUTDOOR WEIGHT TRAINING PLATFORM

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING

Not Applicable

BACKGROUND OF THE INVENTION

1. Field of the Invention

This invention relates generally to expansible trailers adaptable to provide increased usable floor area, and relates more particularly to expansible trailers adaptable for use as a mobile gym.

2. Description of Related Art

Expandable trailers are not new. However, up to now, expandable trailers have been cumbersome to use, complicated to make, and expensive to build. A typical prior art example is disclosed in U.S. Pat. No. 4,135,755 to Steffens. In the Steffens patent the roof, walls, and floor of the structure are interconnected by a sophisticated arrangement of fastening elements, which are hydraulically or pneumatically controlled and operated. Design and assembly of the structure disclosed in the Steffens patent requires a fair amount of precision among interconnected parts. An error in arrangement of one element renders the entire structure inoperable. The precision design demands of the Steffens patent drives up manufacturing costs. Manufacture of the typical expansible trailer, in general, exceeds the purchase price of most motor vehicles (such as heavy duty pick up trucks) required to tow such trailers. An object of the present invention is to develop an expansible trailer, the manufacturing costs of which are in the range of the retail purchase price of a typical heavy duty conventional trailer.

The mobile gym disclosed in U.S. Pat. No. 5,667,267 to Talucci appears simplistic. The Talucci patent discloses a trailer with expandable side panels which are lowered and raised by spring tensioning means, the construction and operation of which are very simple. However, the spring tensioning means themselves obstruct the usable area of the expanded floor. The Talucci patent is very simple to make and operate but does not disclose a simple means for maximizing the usable area of the expanded floor. An object of the present invention is to provide an expandable trailer that maximizes the usable area of the expanded floor, and whose operation is simple. Another object is to develop an expansible trailer whose walls are easily extended and retracted by a single person and in a substantially short time. An additional object of the present invention is to develop an expansible trailer, the manufacturing costs of which are in the range of the purchase price of a typical heavy duty conventional trailer.

BRIEF SUMMARY OF THE INVENTION

The present invention provides an expansible trailer with retractable walls, comprising a platform with a floor, an underside, and four peripheral edges. The trailer also comprises two sets of opposing walls. Each wall had an outside and inside surface and two sets of opposing peripheral edges. Each wall has a peripheral edge hingedly attached to a platform peripheral edge, forming a right angle between the wall inside surface and platform floor. Hinged in this fashion, the four walls and platform floor form a box with substantially square corners between the walls. Each wall is capable of swinging about its hinged edge to where the wall inside surface and the platform floor are coplanar.

One set of opposing walls have hinged wall sections along the wall edges forming said corners. The hinged wall sections have inside and outside surfaces. The hinged wall sections partially overlap the other set of opposing walls when all the walls are upright at right angles with the platform floor, wherein the inside surface of each hinged wall section is coplanar with and faces the outside surface of one of the other opposing walls. In this orientation, the hinged wall sections are capable of being fastened to the outside surfaces of the other set of opposing walls, preventing the four walls from collapsing. Additionally, the hinged wall sections fill the gaps between the walls when the walls are coplanar with the platform floor, wherein the inside surfaces of the hinged wall sections are coplanar with the inside surfaces of the walls and the platform floor.

The trailer also comprises a plurality of supports fixed to the outside surfaces of the hinged wall sections and fixed to the outside surfaces of all the walls proximal to each wall's free edge opposite the wall edge hinged to the platform floor. The supports have a load bearing capacity sized to support the weight of a wall or hinged wall section, and the weight of exercise equipment while being used by people when all walls are coplanar with the platform floor and the supports are wedged between the ground and the outside surfaces of the walls and hinged wall sections.

Other objects and advantages of the present invention will be readily apparent upon a reading of the following brief descriptions of the drawing figures, detailed descriptions of preferred embodiments of the invention, the appended claims and drawings.

BRIEF DESCRIPTION OF THE SEVERAL VIEWS OF THE DRAWINGS

The above mentioned and other objects and features of this invention and the manner of attaining them will become apparent, and the invention itself will be best understood by reference to the appended drawings. In the course of the following detailed description, reference will be made to the appended drawings in which.

DESCRIPTION

Definitions

Trailer. A Trailer is an un-powered vehicle having a substantially level, horizontal platform, pulled by a powered vehicle.
Dashpot. A dashpot is a mechanical device, a damper which resists motion via viscous friction. The resulting force is proportional to the velocity, but acts in the opposite direction, slowing the motion and absorbing energy. The dashpots referred to in this application are linear dashpots.

DETAILED DESCRIPTION OF THE INVENTION

Figure 1:
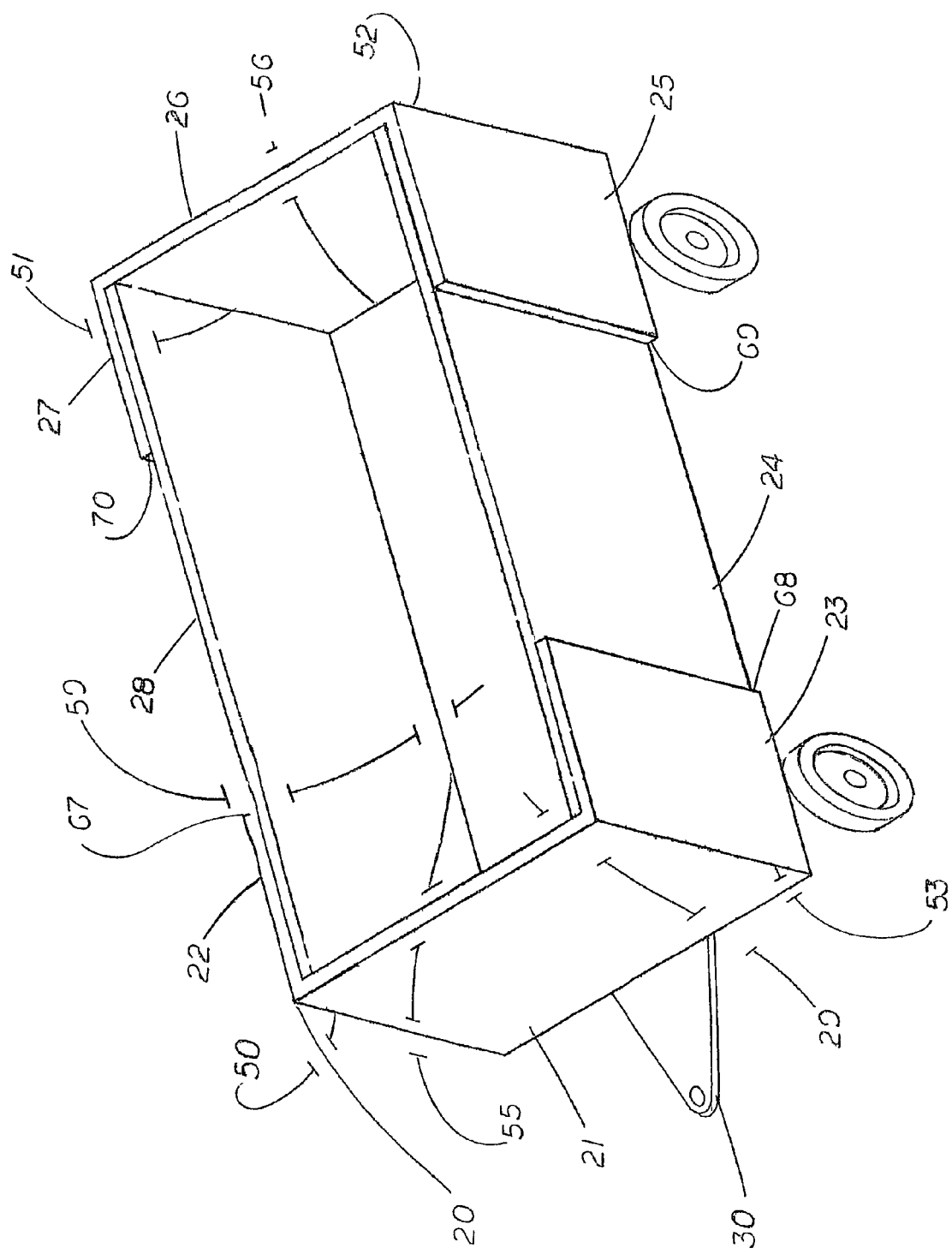
FIG. 1. An isometric of a preferred embodiment of the trailer with retractable walls in the upright position FIG. 2A. A side view of a preferred embodiment of the trailer with the walls in the upright position FIG. 2B. A side view of a preferred embodiment of the trailer with walls coplanar with the platform floor.
Figure 2A:
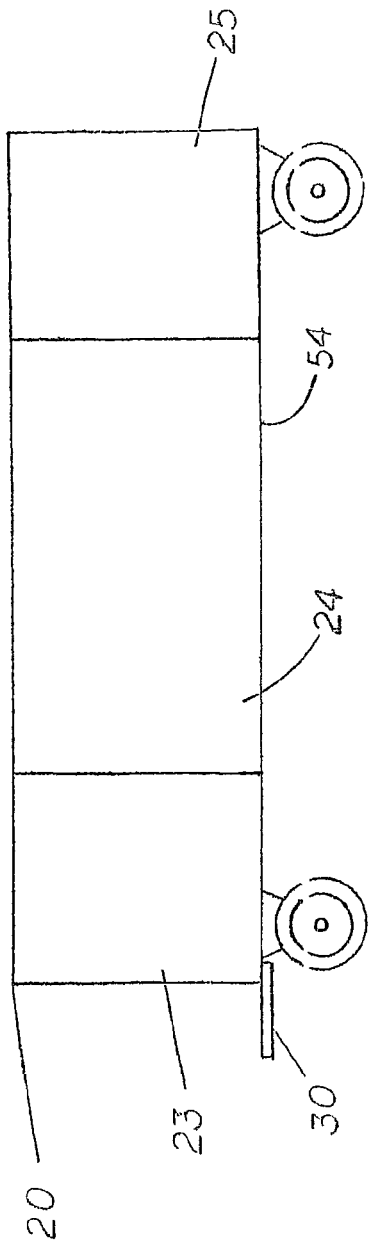
Figure 2B:
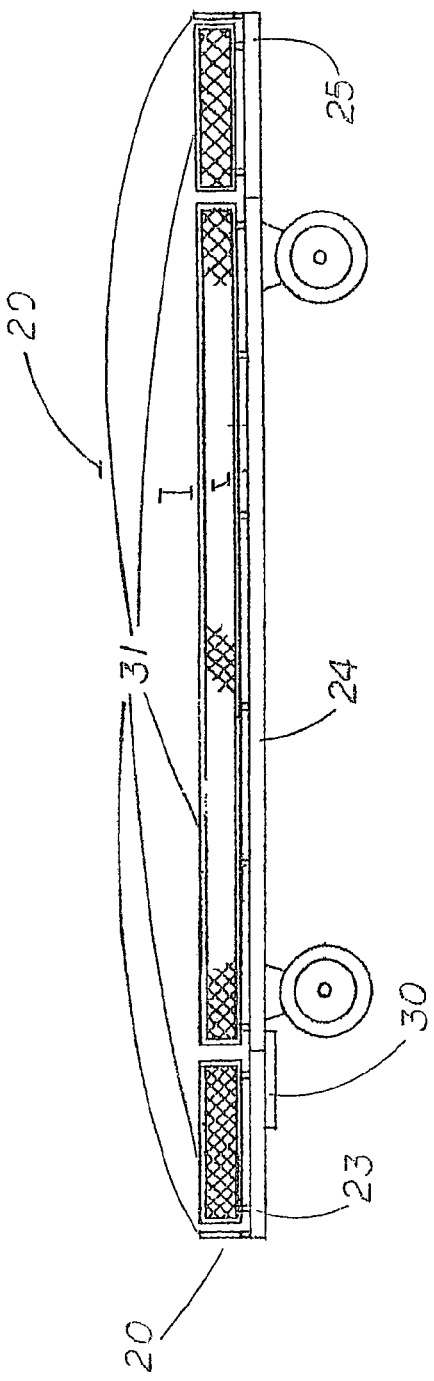
Figure 3:
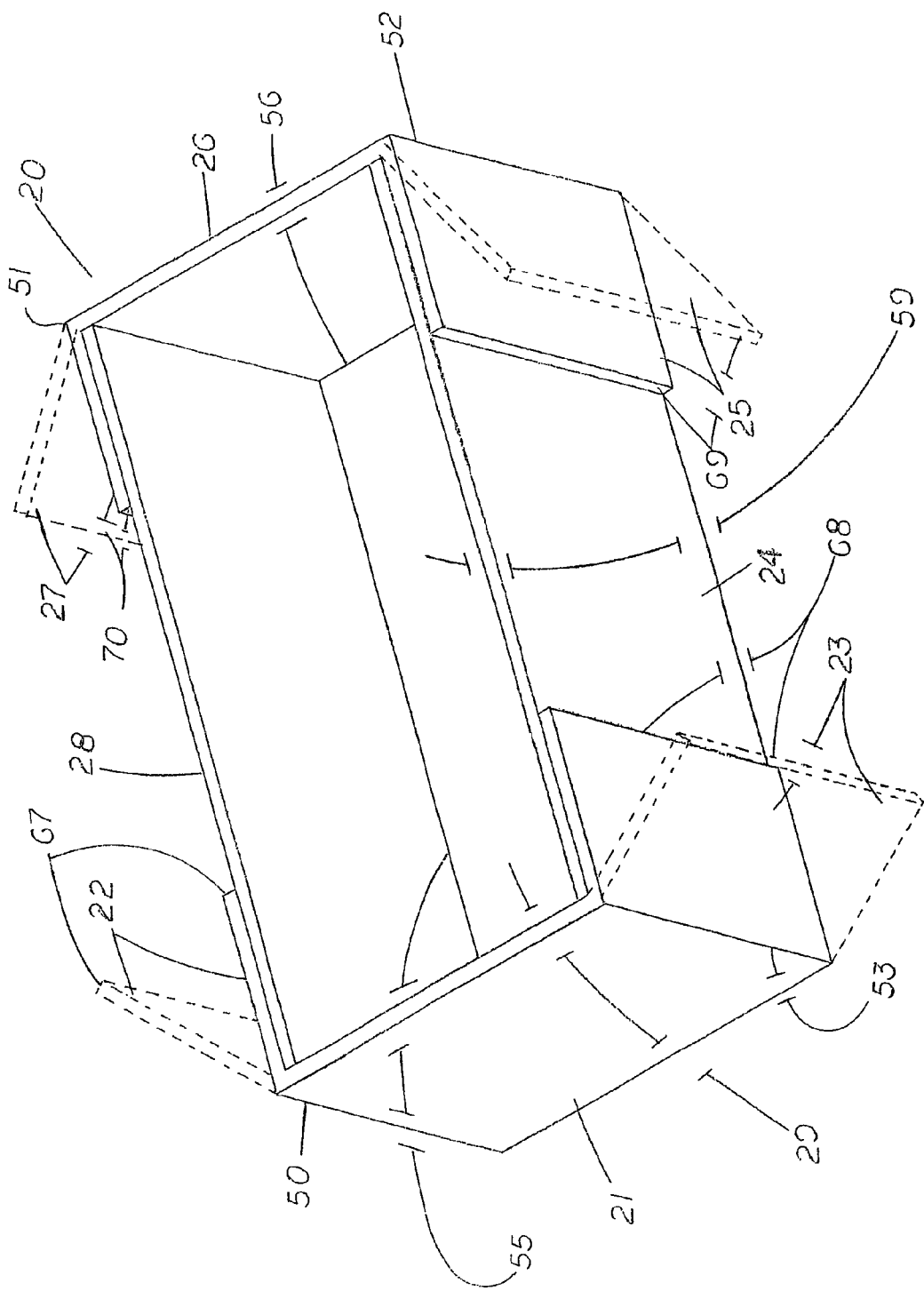
FIG. 3. An isometric of a preferred embodiment of the trailer illustrating the retractability of the hinged wall sections FIG. 4. An isometric of a preferred embodiment of the trailer including railing FIG. 5. An isometric of a preferred embodiment of the trailer including an arched truss wall retractable system FIG. 6A. A side view of a preferred embodiment of the trailer including an arched truss wall retractable system FIG. 6B. A side view of a preferred embodiment of the trailer including an arched truss wall retractable system with the walls coplanar with the platform floor FIG. 7. An isometric of a preferred embodiment of the trailer with the walls coplanar with the platform floor including an arched truss wall retractable system FIG. 8. A side view of a preferred embodiment of a hollow U section of the arched truss FIG. 9. An isometric of a preferred embodiment of a dashpot FIG. 10. A cut-away side view of a preferred embodiment of a hollow U section of the arched truss FIG. 11A. An isometric of a preferred embodiment of the trailer with a roof FIG. 11B. An isometric of a preferred embodiment with a roof illustrating the retractability of the hinged wall sections FIG. 12. An isometric of a preferred embodiment with a roof, illustrating a wall retractable system using a truss, winches, pulleys, and cables FIG. 13. An isometric of a preferred embodiment with a roof, illustrating a wall retractable system using a cylindrical column and beam truss system and a winch pulley system FIG. 14. An isometric of a preferred embodiment, illustrating an attachable staircase FIG. 15. An isometric of a preferred embodiment, illustrating an attachable wheel chair lift FIG. 16. An isometric of a preferred embodiment illustrating a cylindrical column beam truss system FIG. 17. An isometric of a preferred embodiment, illustrating the wall retractable system using a truss, cables, pulleys, and winches FIG. 18. An isometric of a preferred embodiment illustrating the detachability of the cables

In the following description, like reference characters designate like or corresponding parts throughout the several views. Referring now to the drawings in detail, reference is made to FIGS. 1, 2A and B, 3, and 4. The present invention is an expansible trailer 20 (as in FIG. 1) with retractable walls 21, 24, 26, 28. The present invention comprises: a platform 59 with a floor 29, an underside 54, and four peripheral edges 28, 56, 57, and 58; and two sets of opposing walls 21 and 26, and 24 and 28. Each wall 21, 24, 26, 28 has an outside and inside surface and two sets of opposing peripheral edges. Each wall 21, 24, 26, 28 has one of its peripheral edges hingedly attached to a separate platform peripheral edge 28, 56, 57, and 58. The walls 21, 24, 26, 28 are hinged such that they form an upright right angle between each wall 21, 24, 26, 28 inside surface and the platform floor 29. In this orientation, the four walls 21, 24, 26, 28 and platform floor 29 form a box with substantially square corners 50, 51, 52, and 53, between the walls 21, 24, 26, 28. Each wall is capable of swinging about its hinged edge to a position such that each wall's inside surface and the platform floor are coplanar (as in FIG. 4).

One set of opposing walls 21 and 26 have hinged sections 22, 23, 25, and 27 along the wall edges forming said corners 50, 51, 52, and 53. The hinged wall sections 22, 23, 25, and 27 have inside and outside surfaces. The hinged wall sections 22, 23, 25, and 27 partially overlap the other set of opposing walls 24 and 28 when all the walls 21, 24, 26, 28 are upright, at right angles with the platform floor 29. The hinged wall sections 22, 23, 25, and 27 are capable of being fastened to the other set of opposing walls 24 and 28, preventing the four walls 21, 24, 26, 28 from collapsing. The hinged wall sections 22, 23, 25, and 27 fill the gaps between the walls 21, 24, 26, 28 when the walls 21, 24, 26, 28 are coplanar with the platform floor 29; the hinged wall sections 22, 23, 25, and 27 also being coplanar with the platform floor 29 (as in FIG. 4).

Figure 4:
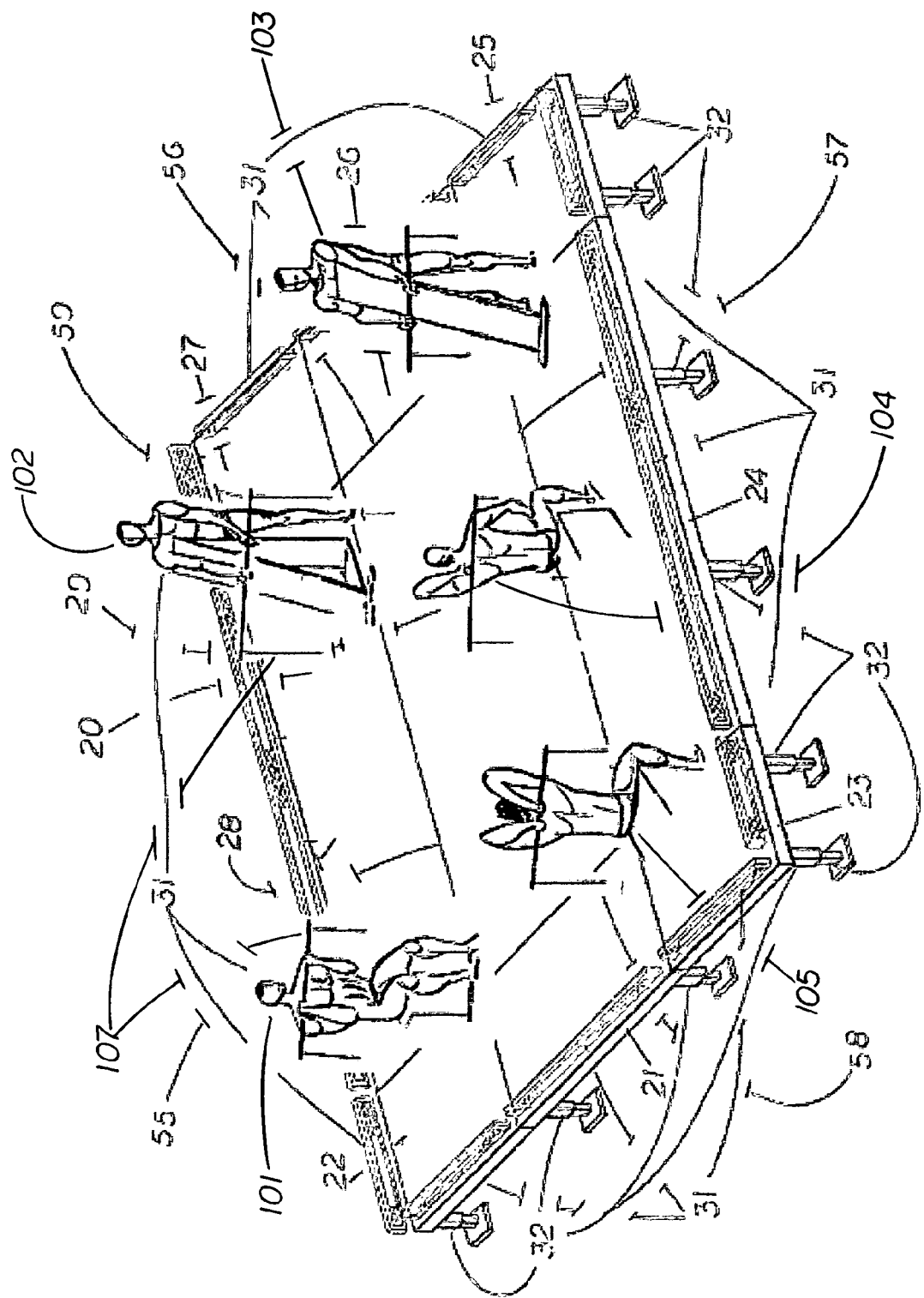
Figure 5:
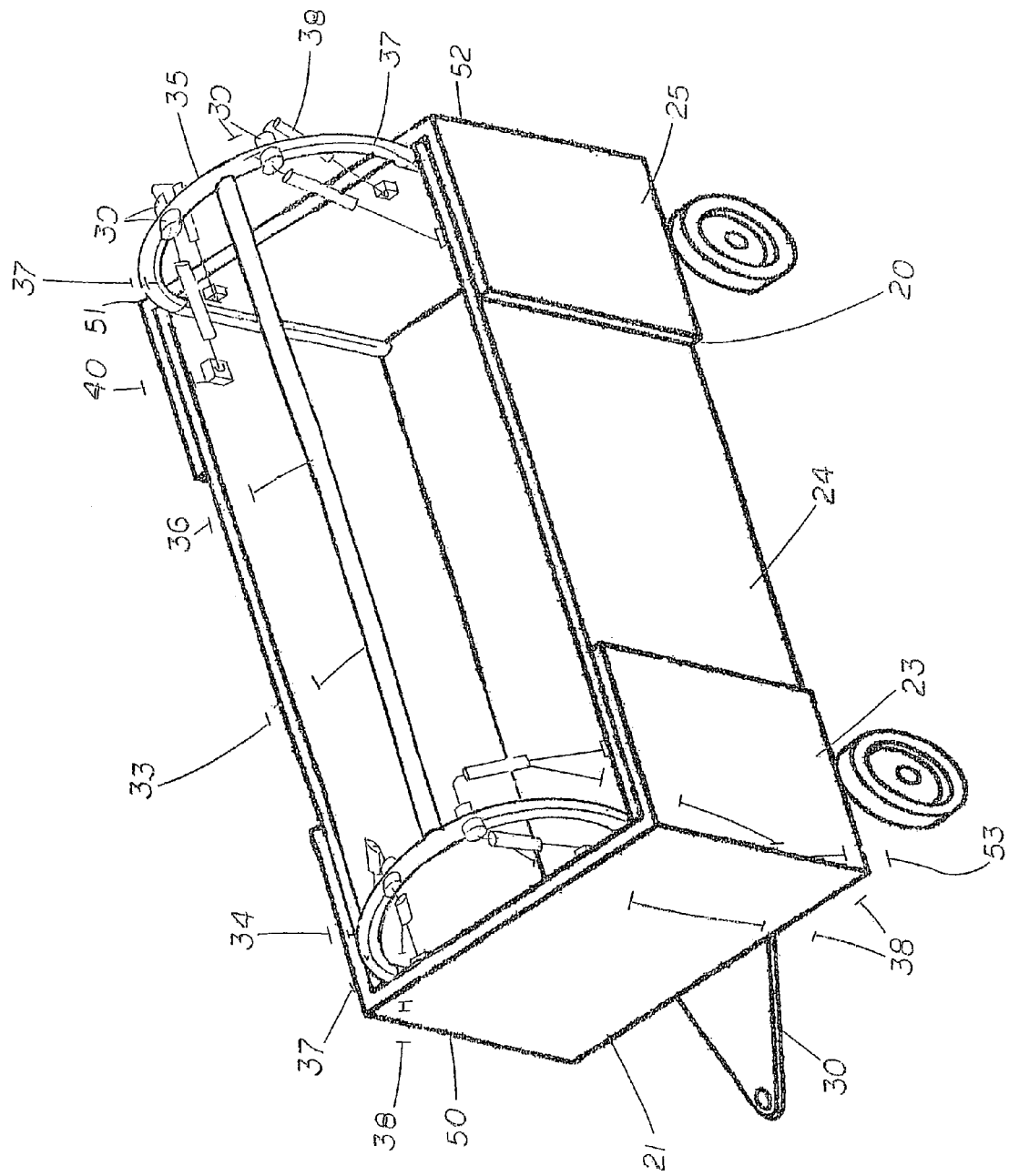
Figure 7:
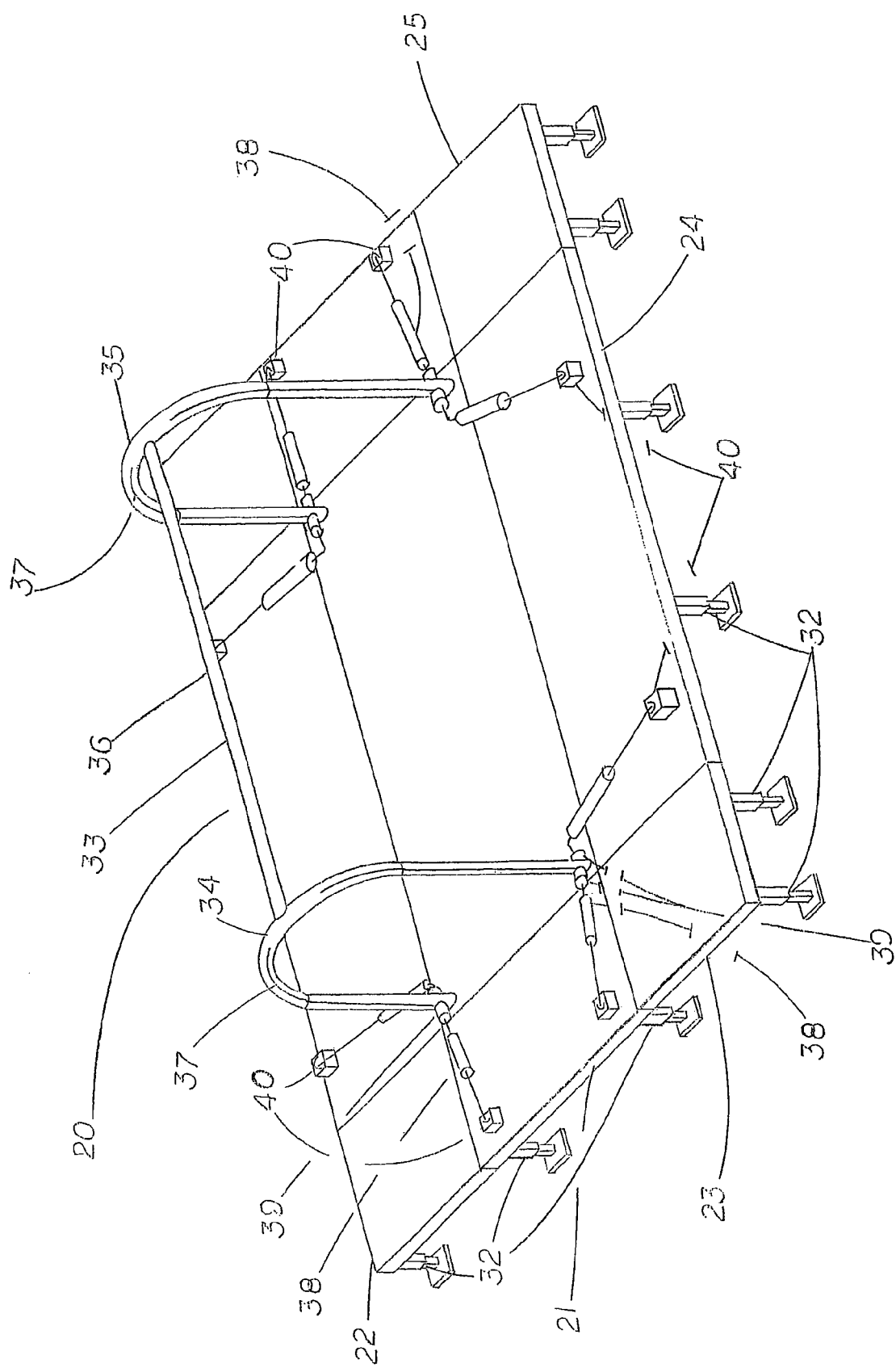
Figure 8:
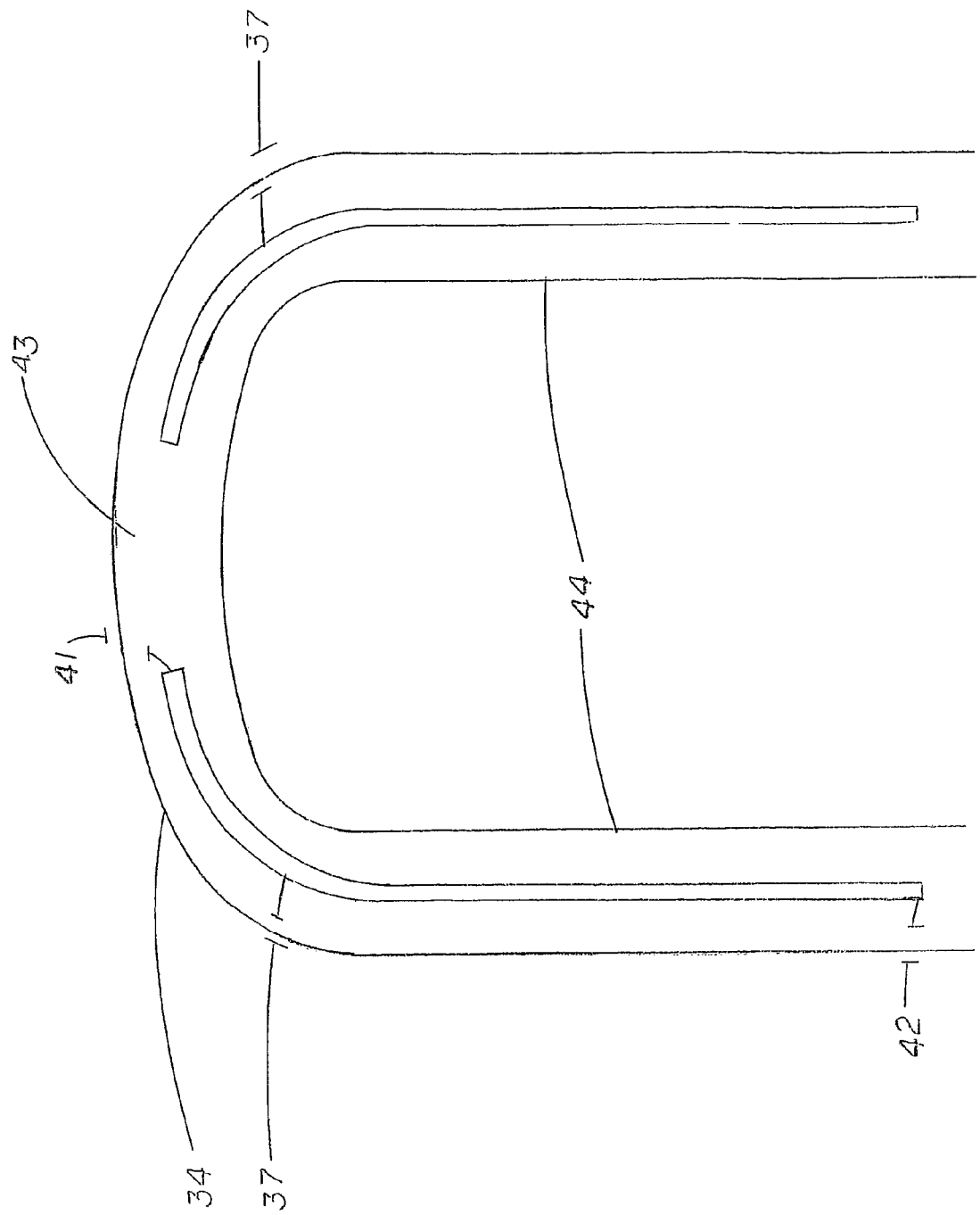
Figure 9:
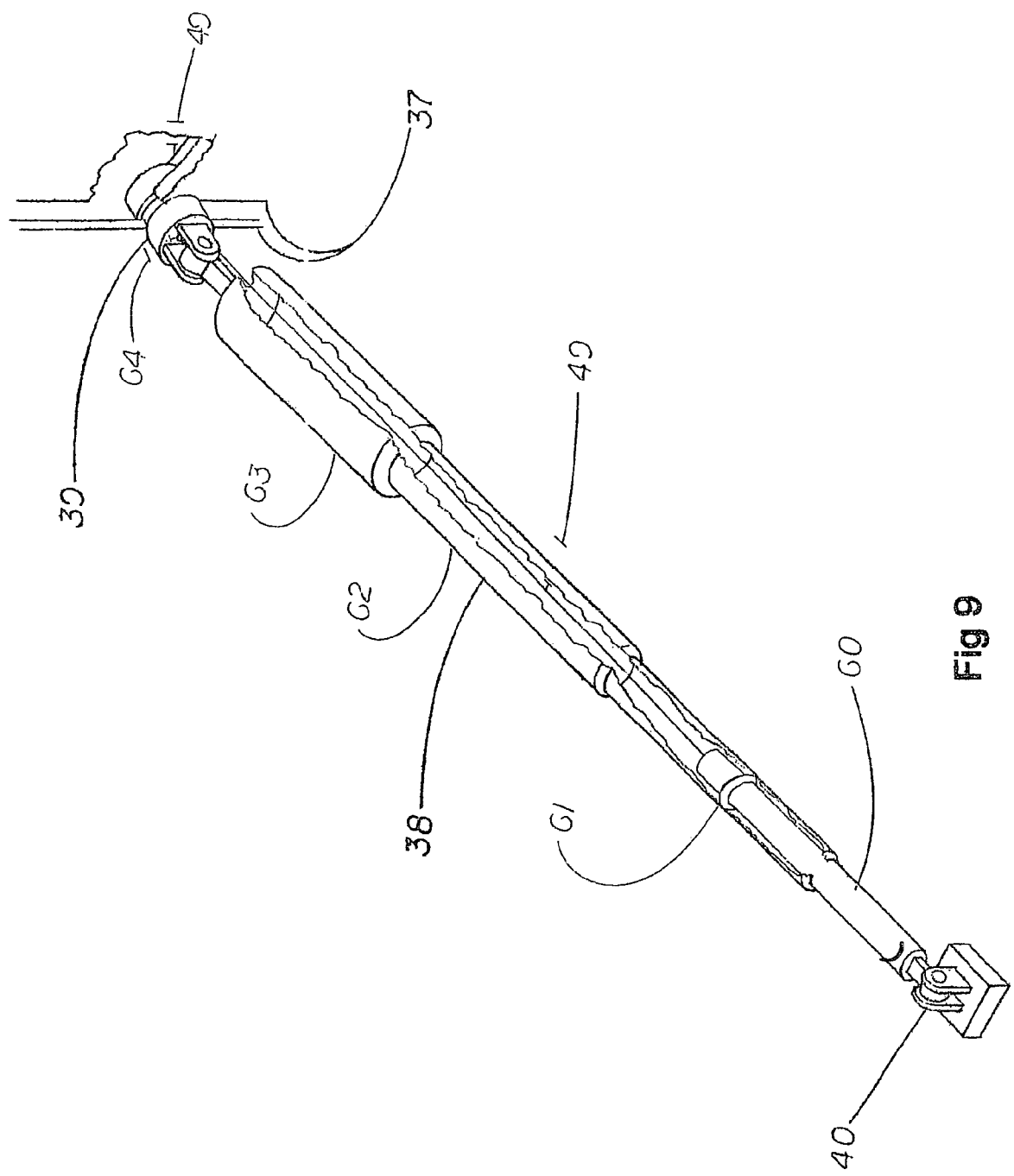
Figure 12:
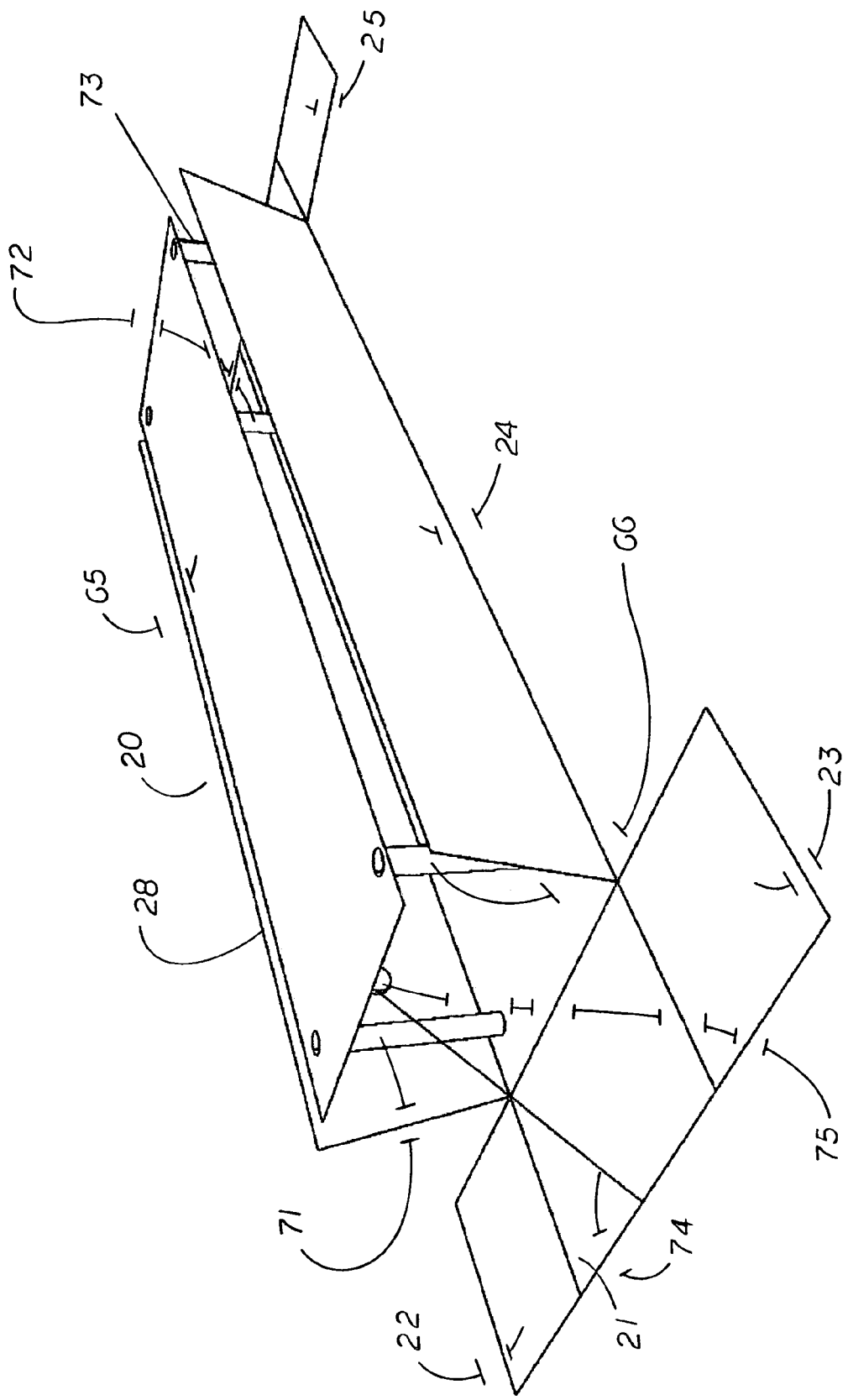

The trailer 20 further comprises a plurality of supports 32 fixed to the outside surfaces of the hinged wall sections 22, 23, 25, and 27 and all walls 21, 24, 26, 28 proximal to each wall's free edge opposite the wall edge hinged to the platform floor 29 (as in FIG. 4). The supports 32 have a load bearing capacity sized to support the weight of a wall or hinged wall section, and the weight of exercise equipment 107 while being used by people 101, 102, 103, 104, 105 when all walls 21, 24, 26, 28 are coplanar with the platform floor 29 while the supports 32 are wedged between the ground and the outside surfaces of the walls 21, 24, 26, 28 and hinged wall sections 22, 23, 25, and 27.

The trailer walls may be made out of any rigid material, preferably metal, capable of supporting the weight of typical exercise equipment while being used by people. The dimension of the walls and platform are not limited. The trailer platform may be the size of a typical light utility trailer, the size of a tractor trailer, or larger. The height of the walls may exceed the platform width. A preferable wall height would be approximately half the length of the platform, resulting in an expanded trailer floor area six times the floor area of the trailer in the retracted position. This advantage maximizes the usable floor area, as no prior art expandable trailer increases the usable floor as much.

Now referring to FIGS. 5, 6A, 6B, 7, 8, 9, and 10. Another preferred embodiment includes wall retractable means including an arched truss system 36 and dashpots 38 (as in FIG. 5). The truss system 36 is mounted to the platform floor 29. The truss system 36 comprises two hollow U sections 34 and 35 and a cylindrical beam section 33. Each U section 34 and 35 has an inside and outside surface, two legs 44 spaced apart and connected by a curvilinear arch 43, and tracks 37 extending from the foot 42 of each leg 44 to the arch 41. The inside surface of the U sections 34 and 35 face each other. Each cylindrical beam 33 end is rigidly attached to the inside surface of a U section 34 and 35 at the middle of the arches 43. All four legs 44 are securely fastened to the floor 29 near the corners 50, 51, 52, 53 between the walls 21, 24, 26, and 28.

Each dashpot 38 has two ends 39 and 40. One end 40 of each dashpot 38 is connected to the inside surface of a separate wall 21, 24, 26, 28 proximal to the wall free edge opposite the wall edge hinged to the platform floor 29 (as in FIG. 7). The other end 39 of each dashpot 38 is slidably connected to a separate track 37. Each dashpot 38 comprises a plurality of telescopically retractable cylinders 61, 62, and 63 and a piston 60. Each dashpot's cylinders 61, 62, and 63 and piston 60 fully extend when the wall to which the dashpot 38 is attached is coplanar with the platform floor 29. In this orientation, each dashpot end 39 connected to one of the tracks 37 slides to the foot 42 of the leg 44.

Now here is a description of how to use the preferred embodiment. When one of the walls 21, 24, 26, 28 is manually lifted to the upright position, the cylinders 61, 62, and 63 and piston 60 fully and resistively retract forcing the dashpot end 39 connected to the track 37 to slide up the track 37. When the walls 21, 24, 26, 28 are upright and the hinged wall sections 22, 23, 25, and 27 are unfastened, the dashpots 38 provide resistance and retards each wall 21, 24, 26, and 28 from pivoting about its hinged edge and falling according to the gravitational weight of the respective wall. In a another preferred embodiment, when the dashpots 38 are fully retracted, they lock and hold the walls 21, 24, 26, and 28 in the upright positions. The advantages of these embodiments are profound, because a single person can expand and lower the walls easily and manually. Manufacturing costs are very low because parts can be massed produced and prefabricated. These preferred embodiments are sturdy and robust but do not require extreme precision to manufacture. These embodiment illustrate redundancies, wherein each wall is attached to two dashpots. If one breaks or malfunctions, one dashpot remains. The dashpots can be sized such that only one is necessary to provide the desired resistance.

Still referring to FIGS. 5, 6A, 6B, 7, 8, 9, and 10, another preferred embodiment comprises each dashpot 38 being connected to a winch 47 by a cable 45 and 49 (as in FIG. 10) and operated by a remote control 106, 107, 108, 109. Each winch 47 is fastened to the platform underside 54. Each cable 45 and 49 is connected to a separate piston 60 (as in FIG. 9) and extends through the cylinders 61, 62, and 63, through the dashpot end 39, inside the track 37, up through the arch 43, down through the opposing leg 44, through the floor 29 and to one of said winches 47.

Now here is a description of how to use the preferred embodiment. Operating the remote to reel in the cable attached to one of the winches 47, in turn pulls the piston 60, forcing one of the cylinders 61, 62, and 63 to retract, and forcing the dashpot end 39 to slide up the track to the arch 41, wherein the piston end 40 pulls one of the walls causing the wall to pivot about its free edge until the wall is in the upright position (as if FIG. 5). Turning the winch 47 in reverse unwinds the cable 45 and 49, wherein the weight of the wall pivots about its hinged edge until the wall is coplanar with the platform floor 29, wherein cylinders 61, 62, and 63 and piston fully extend, and the dashpot end 39 slides to the foot 42.

The material of the truss 36 should be metal, preferably steel. To reduce the overall weight on the platform 29, the truss 36 may be made out of thermoplastic. The height of the truss 36 should be taller than the height of the walls 21, 24, 26, 28. It is preferable to make the height of each truss leg 44 approximately six feet, so that people could walk under the truss arches 43, making maximum use out of the extended floor area. The material of the cable should be metal, preferably steel. However, if the walls are lightweight, the cables may be fiberglass or rope. There are obvious advantages of using the truss 36, dashpots 38, cables 49, and winches 48 to lower the walls. The truss 36 may be easily prefabricated and mass produced making manufacture cheap. Installing the truss 36, dashpots 38, cables 49, and winches 48 is simple. More importantly, lowering and raising the walls is as simple as operating a one of the remote controls 106, 107, 108, 109. Even without the cables 39, winches 48, and remote controls, 106, 107, 108, 109, lowering and raising the walls, using the truss 36 and dashpots 38 is easy, and can be operated by one person. A person can simply unfasten both of the hinged wall sections 22, 23, 25, and 27 attached to a single opposing wall 24 or 28, and the person will be able to lower the wall 24 or 28 manually, without having the wall 24 or 28 collapse too quickly because the dashpots 38 will arrest some of the weight of the wall as stated above. Then a person could unfasten the hinged wall sections 22, 23, 25, and 27 attached to the other opposing wall 28 or 24, allowing each opposing wall 21 and 26 to collapse under the resistance of the dashpots 38, and then the person could lower the remaining opposing wall 28 or 24.

Figure 16:
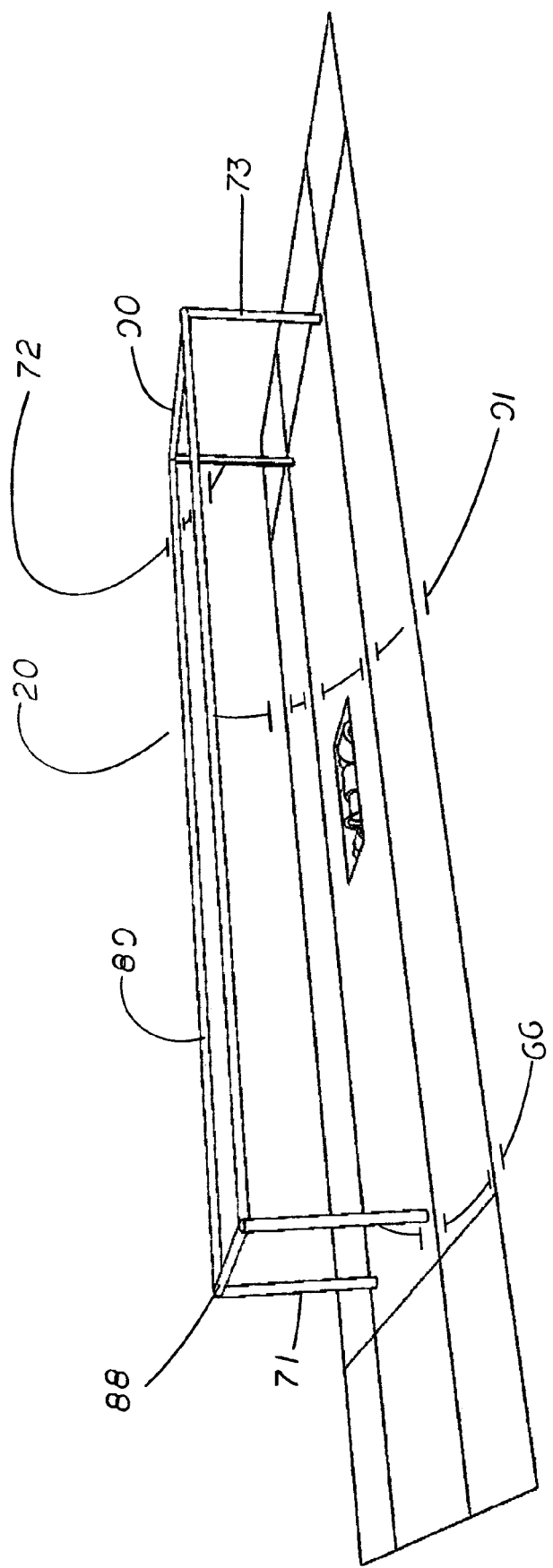
Figure 17:
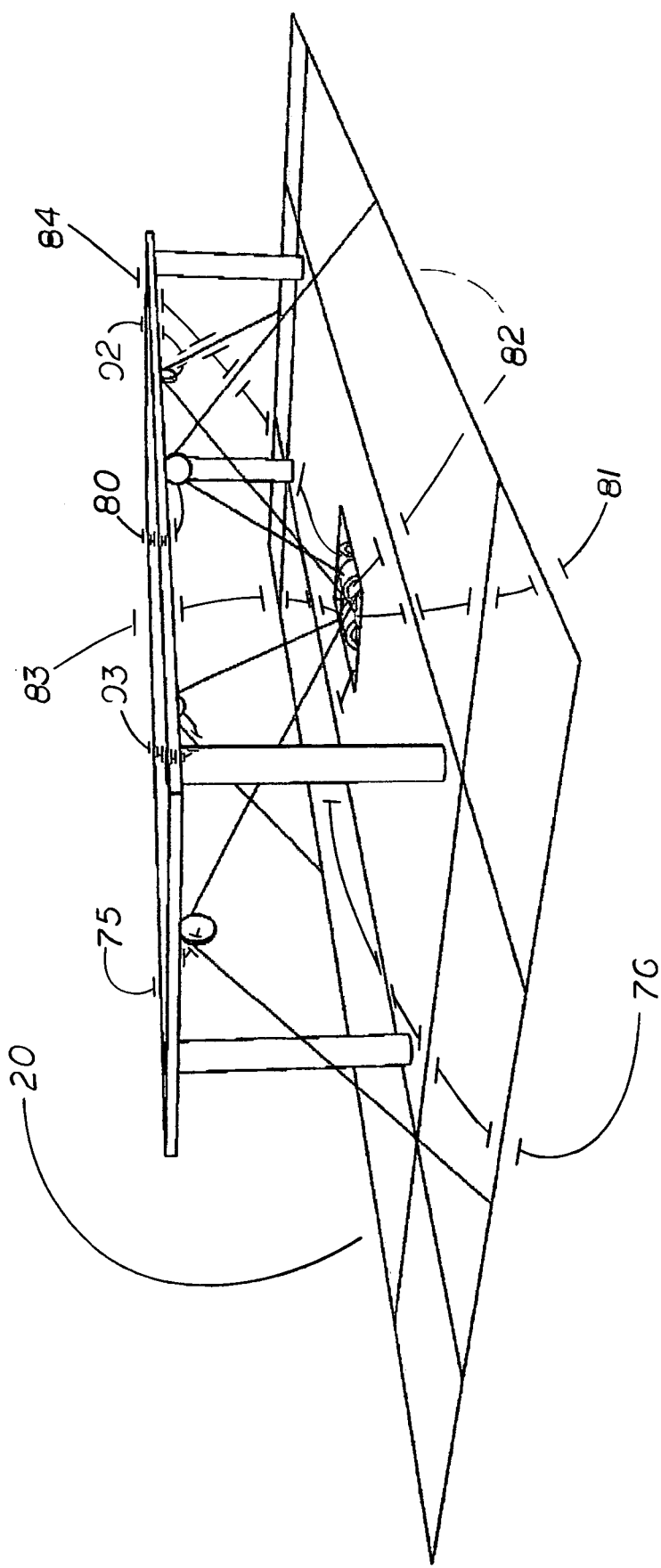
Figure 18:
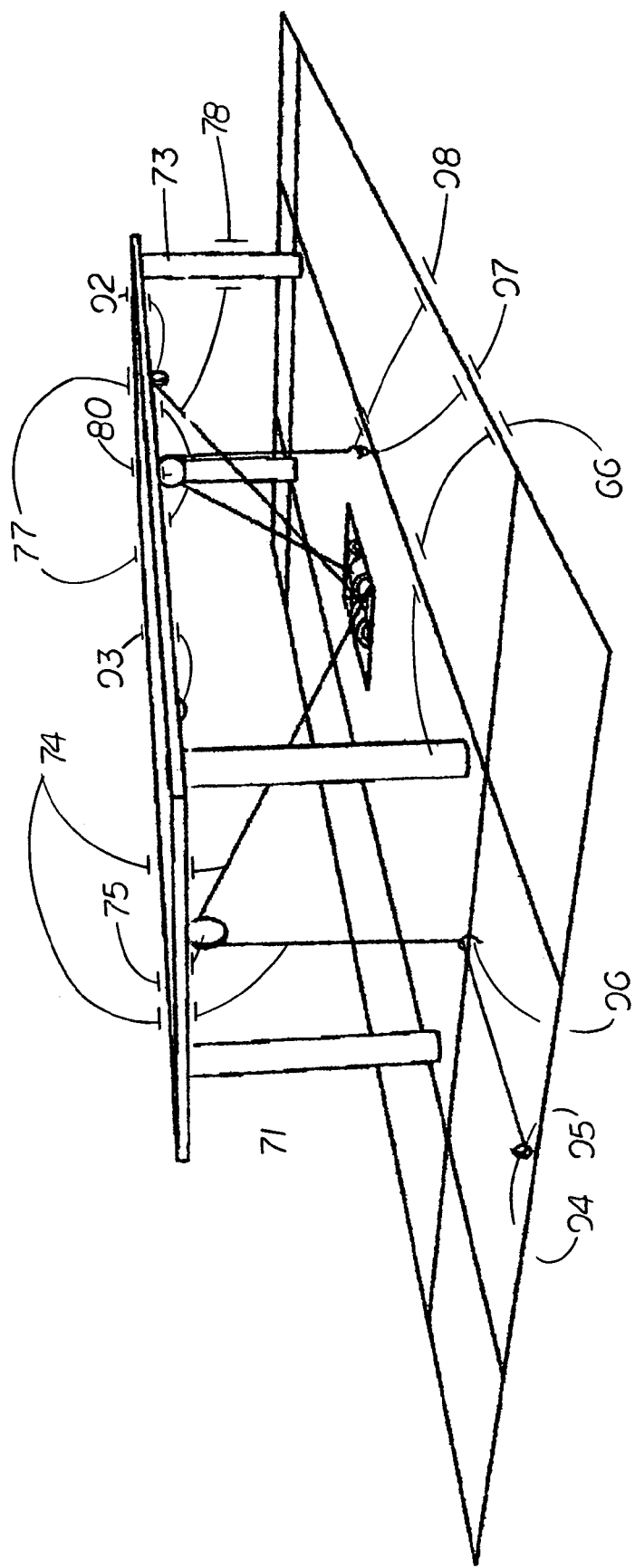

Now referring to FIGS. 11A and B, 12, 13, 14, 15, 16, 17, and 18, another preferred embodiment includes wall retractable means comprising a cylindrical column and beam truss system connected by cables and pulleys to remotely controlled winches. The truss system comprises four columns 66, 71, 72, and 73 and four beams 88, 89, 90, and 91. One end of each column 66, 71, 72, and 73 is rigidly fastened to the platform floor 29 near one of the corners 50, 51, 52, and 53 (as in FIG. 16). The beams 88, 89, 90, and 91 are rigidly fastened between the columns 66, 71, 72, and 73 at the other end of each column 66, 71, 72, and 73 (as in FIG. 16). Each pulley 75, 80, 92, 93 is anchored to a separate beam 88, 89, 90, and 91. All four winches 81, 82, 83, and 84 are mounted to the platform underside 54 at the center of the platform 29. The winch cables 74, 77, 78, and 79 extend through apertures in the center of the platform floor 29 (as in FIG. 17). Each cable 74, 77, 78, and 79 is attached to a separate pulley 75, 80, 92, 93, and fastened to the inside surface of a separate wall 21, 24, 26, 28 near the free wall edge opposite the wall edge hinged to the platform floor 29 (as in FIGS. 17 and 18).

Now here is a description of how to use the preferred embodiment. Operating one of the remote controls 106, 107, 108, 109 to reel in one of said cables pulls the wall to which the cable is attached, causing the wall to pivot about the wall edge hinged to the platform floor, lifting the wall to its upright position (as in FIGS. 11A and B, and 12). Operating one of the winches in reverse, to unwind one of the cables, has the opposite effect, wherein the weight of the wall against the tension in the unwinding cable causes the wall to collapse, pivoting about its edge hinged to the platform floor, until the respective wall is coplanar with the platform floor 29, the falling rate of the wall being controlled by the one of the remote controls 106, 107, 108, 109. This embodiment provides the best means for lowering and raising the walls, because the dashpots 38 are unnecessary, reducing manufacturing costs. And it is very expedient to install the pulleys 75, 80, 92, 93 and winches 81, 82, 83, and 84. Also, a truss made out of cylindrical beams and columns is cheaper to manufacture than the arched truss 36, because the cylindrical beams and columns are readily available.

Figure 13:
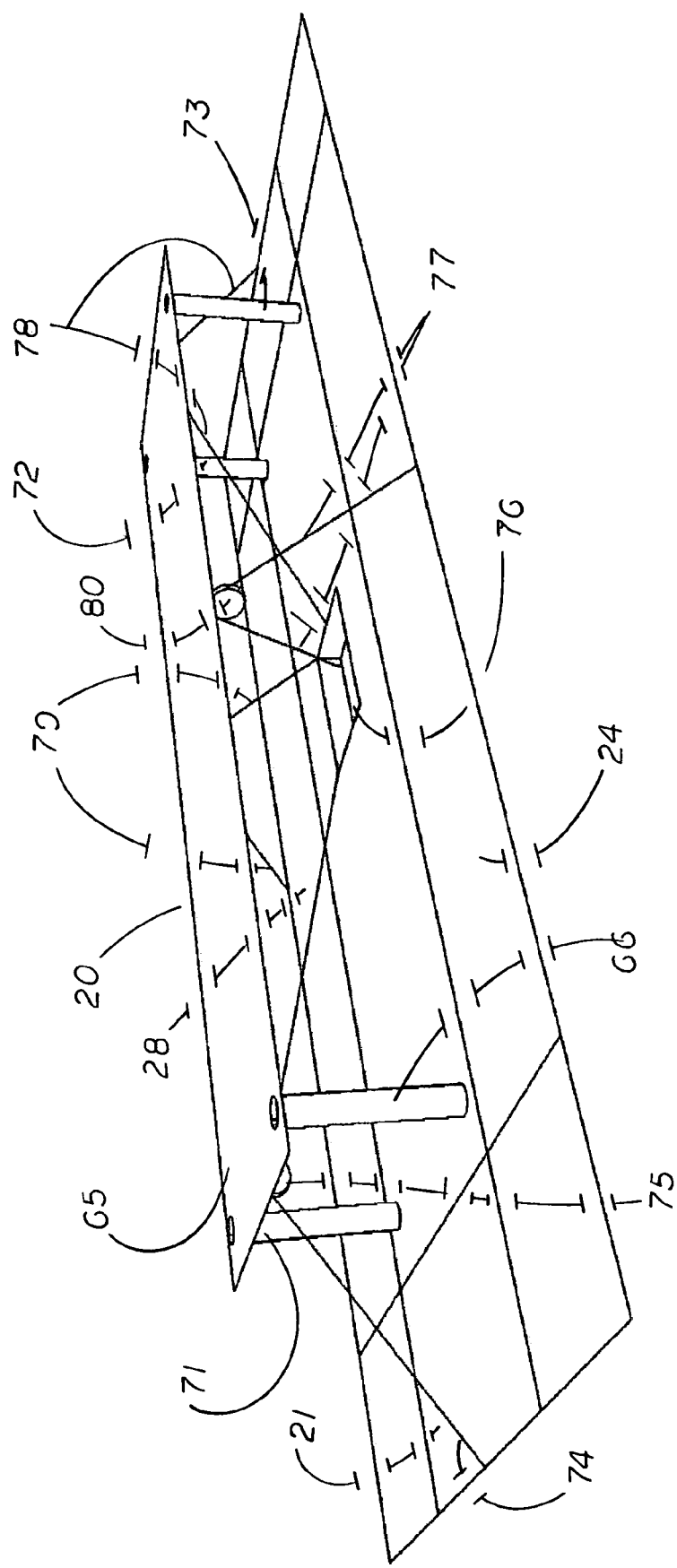
Figure 14:
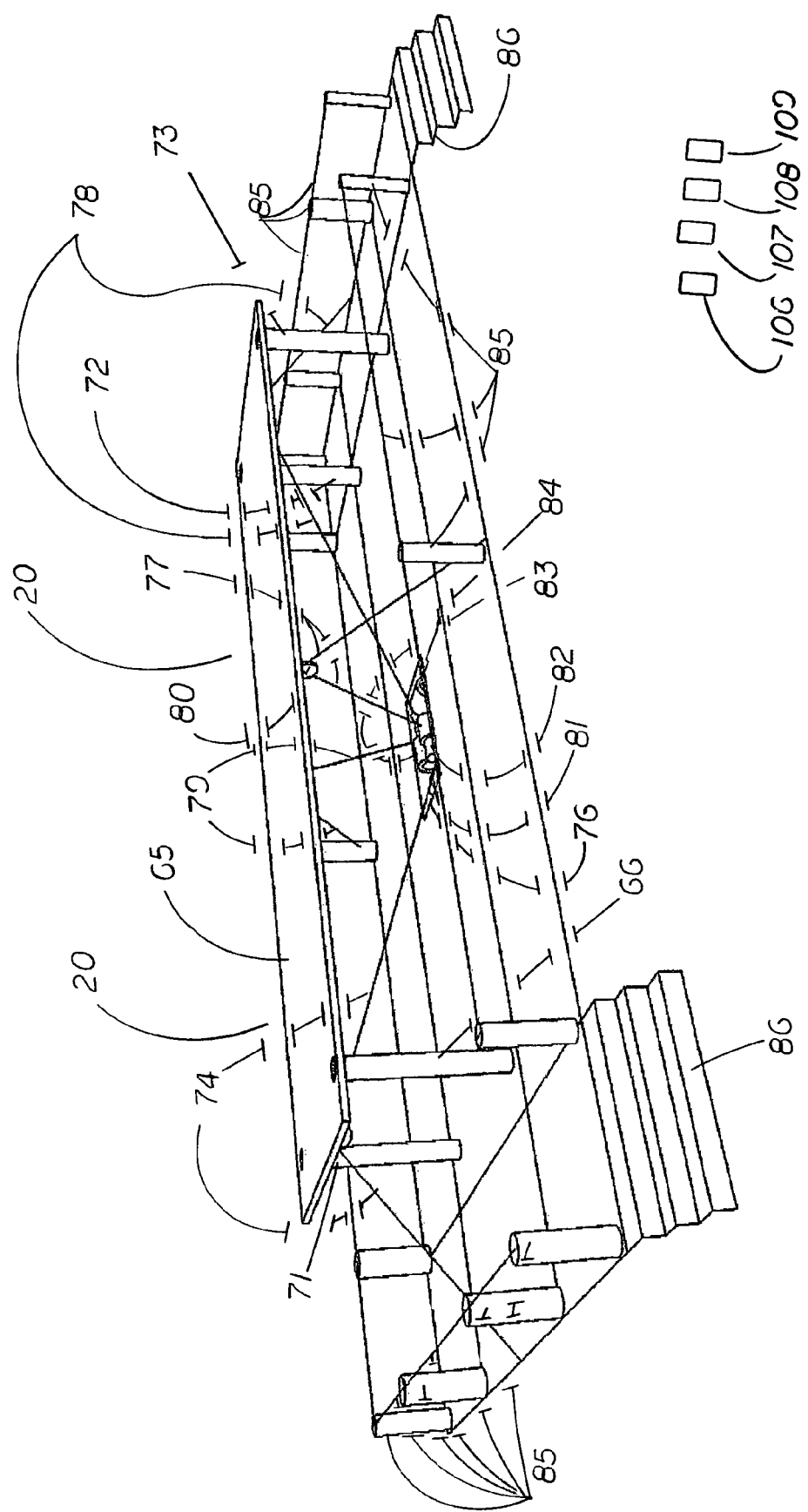
Figure 15:
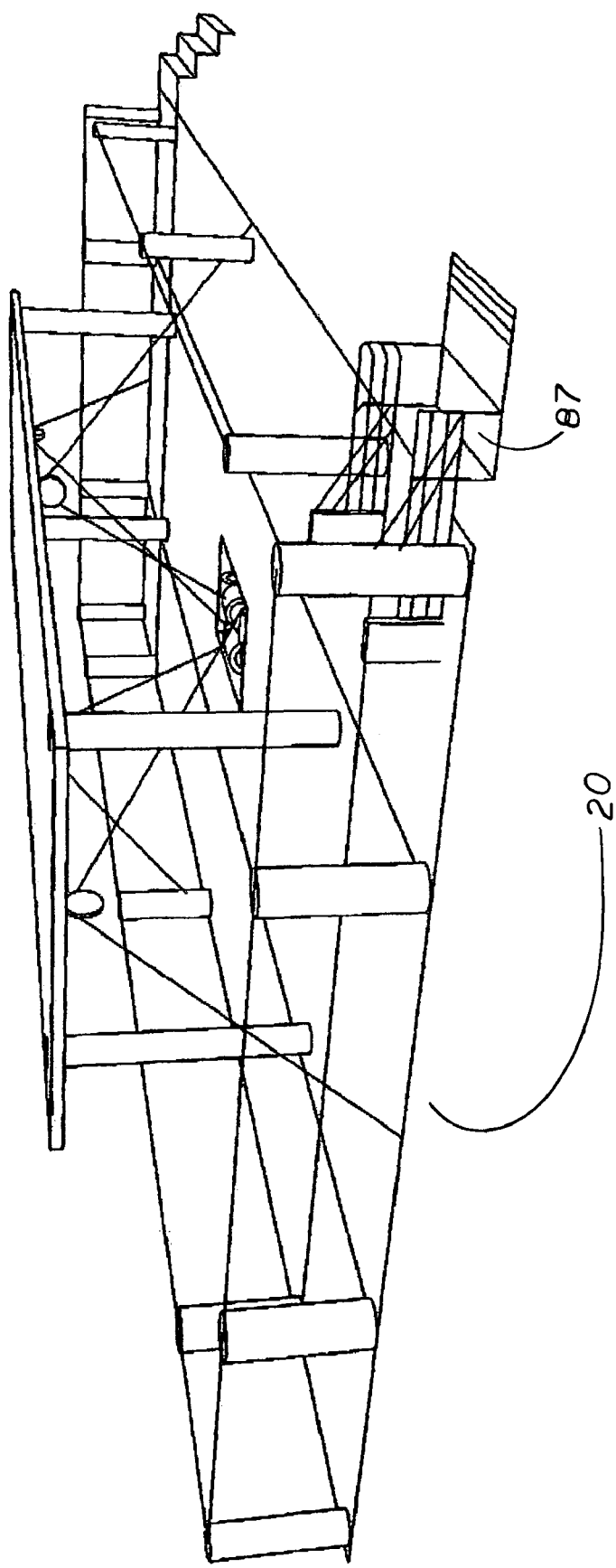

In another preferred embodiment, a roof 65 is mounted on top of the beams 88, 89, 90, and 91, providing shading from the sun (as in FIG. 13). In another preferred embodiment, railing 85 is mountable along the inside surfaces of all the walls 21, 24, 26, and 28 and hinged wall sections 22, 23, 25, and 27 when the hinged wall sections are coplanar with the platform floor 29 (as in FIG. 14). In another preferred embodiment a modular staircase 86 is mountable to the hinged wall sections' free edges when the hinged wall sections 22, 23, 25, and 27 are coplanar with the platform floor 29 (as in FIG. 14). In another embodiment, a wheelchair lift 87 is mountable to at least one of the hinged wall sections' edges when coplanar with the platform floor (as in FIG. 15). In another embodiment, each cable 74, 77, 78, and 79 is detachably fastened to each wall, 24, 26, and 28, wherein when a wall is coplanar with the platform floor, the cable may be detached, and reeled into one of the winches, whereby the cable does not obstruct the path of a person 101 using the exercise equipment 107 mounted on the inside surfaces of the walls and hinged wall sections when coplanar with the platform floor (as in FIG. 18).

Referring again to FIGS. 1, 2A and B, 3, and 4, another embodiment comprises a substantially horizontal rectangular platform 59 comprising a floor 29, an underside 54, two longitudinal edges 55 and 57, and two transverse edges 56 and 58. The preferred embodiment further comprises opposing sidewalls 24 and 28, each sidewall 24 and 28 having an inside surface and outside surface, a hinged edge 55 and 57 and an opposing free edge; each sidewall 24 and 28 being hingedly connected to one of the platform longitudinal edges 55 and 57, wherein each sidewall 24 and 28 is capable of swinging about its hinged edge 55 and 57 between an upright position, relative to the platform floor 29, and a horizontal position, substantially coplanar with the platform floor 29.

The preferred embodiment further comprises a front wall 21 comprising an inside surface and an outside surface, two panels 22 and 23 with inside and outside surfaces, a free edge and an opposing edge 58 hinged to a platform transverse edge 58, and two opposing side edges 50 and 53 hinged to separate one of said panels 22 and 23, wherein each panel 22 and 23 is capable of swinging about the respective panel's hinged edge 50 and 53 to a coplanar position relative to the front wall 21 and perpendicular to the front wall 21 when the front wall 21 is in an upright position relative to the platform floor 29. The embodiment further comprises a rear wall 26 comprising, an inside surface and an outside surface, two panels 25 and 27 with inside and outside surfaces, a free edge and an opposing edge 56 hinged to the other platform transverse edge 56, and two opposing side edges 51 and 52, each respective rear wall side edge 51 and 52 hinged to one of said rear wall panels 25 and 27, wherein each rear wall panel 25 and 27 is capable of swinging to a coplanar position relative to the rear wall 26 and a position perpendicular to the rear wall 26 when the rear wall 26 is in an upright position relative to the platform floor 29.

The preferred embodiment further comprises a plurality of sturdy angle braces 32 fixed to the outside surfaces of all walls 21, 24, 26, and 28 and panels 22, 23, 25, and 27. The angle braces 32 attached to the panels 22, 23, 25, and 27 are attached near the panel free edge opposite the respective panel hinged edge 50, 51, 52, and 53. The angle braces 32 attached to the front, rear and side walls 21, 24, 26, and 28 are attached near the wall free edge opposite the wall edge 55, 56, 57, and 58 hinged to the platform 29. The angle braces 32 have a load bearing capacity sized to support the weight of a wall 21, 24, 26, and 28 or panel 22, 23, 25, and 27, and the weight of exercise equipment while being used by people 101, 102, 103, 104, 105 when all walls 21, 24, 26, and 28 and panels 22, 23, 25, and 27 are coplanar with the platform floor 29, and the angle braces 32 are wedged between the ground and the exterior surfaces of the walls 21, 24, 26, and 28 and panels 22, 23, 25, and 27.

What is claimed is:

1. An expansible trailer with retractable walls, comprising: four walls, including a retractable front, rear, left and right opposing side-walls, each wall having an outside and an inside surface, a hinged peripheral edge and an opposing free edge with two opposing side edges there between; a platform floor, having an underside, front and rear peripheral edges and left and right opposing side peripheral edges; the front, rear, left and right side walls being hingedly connected to the platform floor at the front, rear, left and right platform peripheral edges, respectively, wherein when the four walls form an upright right angle between each wall inside surface and the platform floor, the four walls and platform floor form a box with substantially square corners between the walls; each wall being capable of swinging about each respective wall's hinged peripheral edge until each respective wall's inside surface and the platform floor are coplanar;

four panel sections, which are substantially square, comprising a first panel section, a second panel section, a third panel section, and forth panel section; each panel section having a hinged peripheral edge and an opposing free edge; the side edges of the front and rear walls being separately and hingedly connected to the hinged edge of the first, second, third, and fourth panel section, respectively; wherein, the side, front, and rear walls being upright at right angles with the platform floor, the hinged first and third panel sections overlap and are capable of being fastened to the left opposing side wall, and the second and fourth hinged panel sections overlap and are capable of being fastened to the right opposing side wall, preventing the four walls from collapsing; wherein the four walls being coplanar with the platform floor; the panel sections are also coplanar with the platform floor and substantially fill the space between the side peripheral edges of the side, front, and rear walls, respectively; and wherein at least one piece of exercise equipment being capable of being loaded onto the platform floor, the four walls, and hinged panel sections; the expanded trailer floor area comprising the inside surfaces of the front, rear, and side walls, panel sections, and the platform floor when the four walls and panel sections are coplanar with the platform floor;

and a plurality of supports fixed to the outside surfaces and proximal to the free edges of the hinged panel sections, the side, front, and rear walls; the supports having a load bearing capacity sized to support the weight of one of said walls or one of said hinged panel sections, and the weight of at least one piece of exercise equipment while being used by people when the four walls and hinged panel sections are coplanar with the platform floor and the supports are wedged between the ground and the outside surfaces of the walls and hinged panel sections;

wherein when the four walls and the platform floor form a box, the trailer being capable of being loaded with at least one piece of exercise equipment, attached to a motor vehicle, and towed on the road; wherein when the four walls are coplanar with the platform floor, at least one piece of exercise equipment being capable of being spread across the expanded trailer floor area;

and wherein when the side, front, and rear walls and the platform floor form a box, one person being capable of lowering the four walls by unfastening the first and second hinged panel sections; then the person being capable of first lowering the unfastened rear wall; the side and front walls remaining upright because of the side walls being fastened to the third and fourth hinged panel sections hingedly attached to the front wall; the person then being capable of unfastening the third or fourth hinged panel sections, allowing the side walls to collapse one at time while the person is holding the front walls; then the person being capable of lowering the front wall.

2. The trailer in claim 1, wherein the walls and hinged panel sections are made out of metal, and wherein the trailer platform dimensions can be sized to equal the size of the platform of light utility trailer platform sold in the United States.

3. The trailer in claim 1, wherein the trailer platform dimensions can be sized to equal the size of any commercial tractor trailer platform.

4. The trailer in claim 1, wherein the height of the four walls equal approximately half the length of the platform floor, resulting in an expanded trailer floor area six times the area of the platform floor.

5. The trailer in claim 1, wherein a rigid truss system is mounted to the platform floor, and a winch pulley system is mounted to the truss system and each wall; the truss system comprising four columns, first column, second column, third column, and fourth column; each column having a first end and a second end; and four beams, first beam, second beam, third beam, fourth beam; each beam having a first and second end; the four beams being connected end-to-end, and connected to and supported by the second end of a separate column, substantially forming a box with the first end of each column rigidly fastened to the platform floor near a separate corner between the walls when the walls are upright forming a right angle with the platform floor, the winch pulley system comprising, four winches including a remote control and operating in three modes, forward, reverse, and off; four pulleys, first pulley, second pulley, third pulley, and fourth pulley, and four cables; each pulley being anchored to a separate beam, wherein first pulley being anchored to first beam, second pulley being anchored to second beam, third pulley being anchored to third beam, and fourth pulley being anchored to fourth beam; all four winches being mounted to the platform underside at the center of the platform; the center of which platform containing apertures; wherein the cables being extended through the apertures in the center of the platform floor, each cable extending through a separate pulley, each cable being fastened to the inside surface of a separate wall near each wall's free peripheral edge;

in forward mode, the remote control being capable of winding in said cables, causing the wall to which one of said cables is attached to pivot about the respective wall's hinged edge, lifting the respective wall until upright at a right angle with the platform floor; reverse mode having the opposite effect, wherein the weight of anyone of said walls against the tension in the unwinding respective cable causes the respective wall to collapse coplanar with the platform floor, the falling rate of the respective wall being controlled by the remote control.

6. The Trailer in claim 5, wherein the columns are approximately 6 feet.

7. The trailer in claim 6, wherein a roof is mounted on top of the beams, providing shading from the sun.

8. The trailer in claim 7, wherein a railing is mountable along the inside surfaces of all the walls and hinged panel sections when coplanar with the platform floor.

9. The trailer in claim 8, wherein a modular staircase is mountable to the hinged panel sections proximal to the free edge, and wherein a wheelchair lift is mountable to at least one of the hinged panel section's edges when coplanar with the platform floor.

10. The trailer in claim 9, wherein each cable is detachably fastened to each wall, wherein when any one of said walls is coplanar with the platform floor, the cable attached thereto may be detached, and reeled into the winch, whereby the cable does not obstruct the path of a person using exercise equipment mounted on the inside surfaces of the walls and hinged panel sections when coplanar with the platform floor.

* * * * *